United States Patent [19]
Gianni et al.

[11] Patent Number: 5,124,095
[45] Date of Patent: Jun. 23, 1992

[54] PROCESS OF INJECTION MOLDING THERMOPLASTIC FOAMS

[75] Inventors: Richard F. Gianni, Danville; Daniel E. Gianni, Modesto; Michael H. Clement, Antioch; Michael R. Meyers, Sonoma, all of Calif.

[73] Assignee: Quantum Plastics, Inc., Napa, Calif.

[21] Appl. No.: 605,884

[22] Filed: Oct. 30, 1990

[51] Int. Cl.[5] .............................................. B29C 67/20
[52] U.S. Cl. .................................... 264/45.5; 264/50; 264/349; 264/DIG. 13
[58] Field of Search ............... 264/45.5, 50, 328.4, 264/DIG. 13, DIG. 14, DIG. 83, 349

[56] References Cited
U.S. PATENT DOCUMENTS

| | | | |
|---|---|---|---|
| 3,763,293 | 10/1973 | Nussbaum | 264/50 |
| 3,975,473 | 8/1976 | Mulraney | 264/DIG. 13 |
| 4,454,087 | 6/1984 | Hayashi et al. | 264/DIG. 13 |

*Primary Examiner*—James Lowe
*Attorney, Agent, or Firm*—Townsend and Townsend

[57] ABSTRACT

Foam thermoplastic injection molding apparatus and method produces structurally superior foam injection molded products. The process includes plasticating solid polymer to a polymer melt; accumulating the melt in an accumulator having a telescoping inlet, which allows the first melt which enters to be the first to leave the accumulator; combining a preselected amount of melt with a preselected amount of gas in bubble form to form homogenized polymer foam; shearing the homogenized polymer foam to reduce the size of gas bubbles; and injecting the polymer foam through a special gate assembly into a mold. The gate assembly has a removable nose which remains with the mold, allowing the foam to expand within the mold but not allowing the foam to escape the mold. The process and apparatus allow low molded-in stress products to be produced, and can process recyclable thermoplastics, either single materials or mixtures. Thus, no segregation of materials is required.

19 Claims, 7 Drawing Sheets

PROCESS OF INJECTION MOLDING THERMOPLASTIC FOAMS

BACKGROUND OF THE INVENTION

This invention relates to thermoplastic injection molding in general, and specifically to a foam injection molding apparatus and process for foam injection molding of large parts useful in various industries.

The injection molding process is one of the most prolific and universally adaptable methods used to produce molded plastic parts of many shapes, sizes, and physical properties that is available today. Unfortunately, when producing pieces over roughly 25 pounds, problems appear which reduce the efficiency of the process. Improving the overall efficiency for producing large structural pieces is one objective of this invention.

Injection molding machines range from a fraction of an ounce injection capacity to very large units that can provide a shotsize over 800 ounces. The total machine process usually involves a machine, plus mold and necessary auxiliary equipment such as material granulating and loading, parts removal, etc.

The typical injection molding machine consists of two basic entities: (1) the injection unit, which converts the cool solid plastic raw material into a viscous liquid by melting the plastic and then pumps it through a tube "runner system" at extremely high pressure (typically 15,000 to 20,000 psi) into the mold and (2) the clamp unit, which carries the fixed and moving halves of the mold. The clamp opens the mold to release the part previously molded then closes and builds clamp pressure against the mold during injection and solidification of the next part.

The predominant injection system today is the screw-type. The present invention is drawn to methods and apparatus for improving the operating efficiency of this type of injection system.

The most widely used methods of operating the clamp mechanism are: (1) toggle type, (2) straight hydraulic and (3) hydromechanical. Clamping force is required to resist the mold's tendency to open up while being injected with high pressure melted plastic. The toggle type utilizes the action of toggle linkages to multiply the force of a small hydraulic cylinder many times. This system is most used on machines from 50 to 500 tons clamp pressure. A straight hydraulic clamp mechanism utilizes a large, full-stroke hydraulic cylinder to open and close the mold and to build clamp pressure. The system is found in all sizes of machines; it is most popular, however, from 200 tons up to the largest available. The hydromechanical-type clamp mechanism utilizes small cylinders to open and close the mold and one or more large diameter, short-stroke cylinders to build full clamp pressure. This type of clamp mechanism has mainly been utilized in machines of 1,000 tons clamp pressure and over.

The method of building full clamp tonnage varies between utilizing one large cylinder at the center of the machine and four smaller cylinders working on the machine's tie rods.

It would be extremely advantageous if an injection molding process could be devised that could reduce the amount of clamping force required to hold the clamps closed. The large amount of clamp pressure requires a great amount of strength in the molds themselves, leading to very large molds. The larger a mold is, the more heat must be dissipated from the mold, as to be discussed below.

Machines are generally sized by five parameters: (1) dimensions of the platens which hold the molds, (2) length of stroke of the platens, (3) clamp force to hold the molds closed (4) injection capacity (the maximum amount of molten plastic that can be injected ("shot-size")), and (5) plasticating rate (the rate the plastic can be melted). Once the part size and number of cavities is established, a layout of the mold can be made and physical size and stroke of the injection machine determined. The other parameters require knowledge of the material, the process, and a large amount of judgment, based mainly on tests performed on the machines.

In a typical molding cycle, the plastic material is prepared and melted, accumulated and then injected or directly injected into the mold cavity, cooled, and removed from the mold. The cycle can be regarded as a large heat exchange system whereby energy is put in at the injection end; the material transferred to the mold where energy is removed (mold cooling). Unnecessary additional heat input at the injection end lengthens the cooling time required, which can be very significant for large pieces produced on such a machine; thus, proper setup is important in obtaining the most productive cycle. Further, in procedures which utilize a typical accumulator, the first melt into the accumulator is not necessarily the first out, and some degradation (and thus waste) of melt is frequent.

Cooling time in general is the largest portion of the overall cycle time, except where very thin wall parts are involved. The direct time elements can be summarized as: (1) mold close and clamp build-up pressure; (2) injection of melted plastic; (3) part cooling; and (4) unclamping and opening of the mold to remove the part.

Many thermoplastic and thermosetting resins can be injection molded. The process is rapid and highly reproducible parts can be achieved. However, the properties of the resin and the characteristics of the injection molding process are extremely important to achieve satisfactory products. Normally, the "melt" (molten plastic) viscosity as a function of temperature is the most important property of the polymer. For most polymer melts, the viscosity is also dependent on shear rate. This is an important property to understand since within a mold cavity, narrow cross-sections can give high shear rates with a resulting change in viscosity.

Injection molded articles generally have superior mechanical properties in the direction parallel to melt flow compared to those perpendicular to melt flow (i.e., anisotropic). This is due to preferential molecular chain alignment. The extent of anisotrophy increases with decreasing melt temperature. Also, inlet melt pressure affects flow rate and usually gives larger anisotrophy in the molded material when increased. Thus, it would be advantageous to operate at higher temperatures and lower pressures. However, the high temperature leads to significantly increased cycle time, as discussed above, since the cooling time is substantially increased.

The production of very large, structurally sound, but lightweight parts are the focus of many manufacturers today. Some industries, such as the automotive industry, use reaction injection molding, or RIM. RIM utilizes a complete processing system comprised of appropriate mechanical equipment and a properly compounded chemical system to achieve fast and economical production of large parts. Pumps capable of very precise volume control are known in this art. High pressure supplies sufficient energy into the materials to permit intimate mixing in impingement mixhead designs which require no solvent or air flushing between shots and can be directly attached to a mold. The machinery, which is capable of high throughputs, can fill large mold cavities, requiring more than 25 or 30 lbs. of elastomeric materials, in extremely short time periods.

These efforts are indeed impressive, but the production of even larger parts is necessary to produce structures such as underground storage tanks, and other large, structurally sound products. In RIM injection molding, the processor is in fact utilizing a complex chemical reaction within the mold unit and consequently must exert a great degree of control over temperature and material flow in order to obtain the necessary reproducibility. A further disadvantage is that control of temperature affects the pumping and mixing characteristics of the ingredients as well as their reactivity. Further, RIM is not suitable for producing large size parts (greater than about 30 lbs.) having great toughness and strength. Thus, techniques other than RIM have been resorted to.

When injection molding a thermoplastic material such as polypropylene, manufacturers have tried to inject gases into the polymer melt so as to control the "blow factor" of the final product. The term "blow factor," as used herein, means the percentage of void space in the final polymer product. For example, for a given volume of 1 lb. solid resin, a 25% blow factor means only 0.75 lb. of resin would fill the given volume. Manufacturers have identified polymer melt pressure, temperature and injected gas content of the polymer melt as critical factors to control the blow factor in the finished product. A slow cooling is necessary for thick-walled parts where a surface skin will harden and trap molten material at the center. If the skin is not thick enough at the time the part is removed from the mold ("ejection"), the part will shrink extensively, distort and harden with large internal voids. If cooling is too rapid, high molded-in stress and warpage of the molded piece will occur. Thus the precise cooling rate must be determined and controlled to reduce cycle time for conventional injection molding of large pieces. In very large parts, e.g., over 30 lbs., there is some cooling of the plastic as the plastic reaches the furthest extremities of the mold. This cooling affects the amount of injection force that is required to completely form the products that are injection molded since viscosity increases proportionately with cooling. Manufacturers have tried to adjust the amount of injected gas to overcome this cooling effect, by expanding gas after the melt is pumped into the mold, but their methods have been less than satisfactory. Frequently the final product wall has a thick outer skin portion which changes abruptly to an internal void region. In other words, although the final blow factor may be precisely as required in percentage of void space, the actual product will shrink extensively and distort or harden with large internal voids, as discussed above.

It would be advantageous to develop an improved foam injection molding method and apparatus which overcome the disadvantages of these methods. Particularly, it would be advantageous to operate a plasticating extruder more efficiently by using it continuously in a foam injection molding process. It would also be advantageous if the molding cycle time could be reduced through efficient mold and mold gate assembly design, reducing part cooling time, which ties up valuable machine time.

SUMMARY OF THE INVENTION

A process and apparatus have now been discovered that allows removal of molds from the injection molding station prior to the time the product must be ejected from the mold without the loss of polymer foam from the mold, eliminating the long cooling periods required in prior methods and apparatus, and thus significantly reducing the cycle time. Further, a plasticating extruder can be operated continuously using the method and accumulator described herein, and through efficient mold gate assembly design and polymer foaming apparatus, the final blow factor of the products can be precisely controlled. The process does not require a conventional press as polymer melt is kept hot and thus at low viscosity, although conventional presses may be used if desired. The apparatus and method are suitable for processing a large variety of raw thermoplastic materials, including recyclable thermoplastics of a single type and mixtures of two or more thermoplastics.

The foam injection molding process of the present invention comprises plasticating a solid polymer into a polymer melt, accumulating the polymer melt in an accumulator having a telescoping inlet and a substantially hollow piston attached to the telescoping inlet. This novel accumulator stores the melt allowing the plasticating extruder to operate continuously and, thus, more efficiently, because the extruder does not have to be shut down during periods when there is no mold in the machine. More importantly, the first polymer melt into the accumulator is the first to leave the accumulator, greatly reducing degradation and waste of polymer melt. The process further includes pumping the polymer melt into a mixing region and combining the polymer melt in the mixing region with gas in bubble form. These bubbles are of preselected size, to form a melted polymer foam. Polymer foam then proceeds through a shearing section or region, thereby reducing or maintaining the bubble size of injected gas in the polymer foam. Polymer foam is then injected into a mold, where the operator is simultaneously adjusting the mold temperature, injection pressure, and size of the injected gas bubbles in the polymer foam, thereby controlling the blow factor of the final polymer foam product to a degree not possible in previously known methods.

Gases used in the process for injection into the polymer melt are generally inert to the polymer melt, although in some cases gases or gas mixtures may be used which react in some way with the polymer melt. This may be disadvantageous in some cases. Oxygen, for example, degrades most polymers by oxidation, especially polymers having double bonds, ether linkages, or tertiary carbons. If the prevention of oxidation is not critical, ordinary shop air can be used as the gas. Bottled gases, commercially available meeting known specifications, such as nitrogen, may be preferred in some applications. The gases may contain small amounts of moisture; however, if the polymer has hydrolyzable linkages such as urethanes and aliphatic ester groups, care must be taken to eliminate moisture. Preferred gases have little moisture and can be considered substantially dry.

As previously stated, one advantage of the present process is in allowing the plasticating extruder to operate continuously, through action of the novel accumulator apparatus. A further advantage is realized in the fact that the molds themselves are kept at a temperature higher than would previously be recommended in such an apparatus. Previously known methods and apparatus would have the injection temperature as low as possible above the melting temperature of the polymer so that the molding cycle would be reduced by not having to cool the mold as long. In fact, the present process reduces molding cycle time, by reducing the wall thickness of molds used, reducing the injection pressures used, increasing the temperature used, a novel gate assembly, a "first-in-first-out" accumulator, and a gas bubble pump to be discussed herein.

A further advantage is that the blow factor can be controlled very precisely through the use of a gas bubble pump. The gas is injected precisely at the outlet of a gear pump thereby injecting the gas at a high shear region in the polymer melt. This acts to evenly disperse the bubbles and cause a pulsation effect in the gas in the gas tubes, whereby the gas is alternately compressed and expanded as the gear pump blades pass by a gas injection location. The polymer foam then traverses a shearing region in which the bubbles are reduced in size within the polymer melt. Then the foamed melt is in a state poised to expand due to the pressure inside the bubbles when the polymer foam reaches the heated mold. The furthest extremities of the mold cavities of even the largest parts can therefore be reached with the expansion of the gas bubbles within the molds. The bubbles in the polymer foam nearest the mold walls actually coalesce, are compressed by the expanding foam and break to form a skin region, the thickness of which can be controlled. The remaining foam gradually forms a region of larger bubbles towards the center of the wall of the molded piece. This gradual change in bubble size has been a goal of previous methods but has not been achieved. It is achieved quite precisely with the apparatus and methods described herein. Blow factor of the final product can be controlled, ranging from about 1% to about 80%, preferably from about 20% to about 60%, primarily by adjusting the output of the bubble pump.

The method of controlling the blow factor can be further described as melting a solid plastic to form a polymer melt at a preselected temperature; flowing a preselected and controlled amount of the polymer melt into a foaming region; combining a preselected volume of gas bubbles with the polymer melt in the foaming region to form a polymer foam with a preselected blow factor; and flowing the polymer foam through a shearing region having a plurality of alternating extrusion plates and rotating blades, the extrusion plates having a plurality of holes. The extrusion plates can either have the plurality of holes with the same diameter for each plate, or, in the preferred embodiment, each succeeding extrusion plate has a smaller hole size. The method of controlling the blow factor further comprises injecting the polymer foam into a mold, expanding the foam in the mold to form a substantially bubble free skin region and a region where the gas bubble volume increases towards the center of the molded product, and cooling to form the final injection molded product.

In one embodiment, the method of reducing the cycle time and controlling the blow factors utilizes a gear pump having an inlet taking melted plastic from an accumulator and having an outlet pressure and volume which can be precisely controlled, the gear pump outlet having gas conduits attached thereto so that gas bubbles may be injected into the polymer melt, forming the polymer foam. The polymer melt foaming apparatus further comprises a gas bubble pump having a plurality of cylinders to form gas bubbles, the cylinders having pistons actuated by cams. Each cylinder of the gas bubble pump has a reed valve by which gas bubbles are released from each cylinder. The gas bubbles travel through the conduits to the melt stream at the outlet of the gear pump.

A further feature of the foam injection apparatus and process is a mold gate assembly comprising a gate valve actuating tube; a gate valve nose retention rod coaxial within the gate valve actuating tube; and a hollow gate nose having a plurality of detents on its inner surface, the gate nose removably attached to the retention rod. The hollow gate nose is designed to be removable from the gate assembly and remain with a mold acting as its plug as the mold is removed from the foam injection molding apparatus proper. This apparatus allows polymer foam to expand within the mold, thereby allowing the polymer melt to reach the furthest extremities of the mold cavity, while preventing the polymer foam from actually expanding and leaving the mold cavity itself through the injection gate. The gate valve actuating tube and the retention rod are preferably individually actuated, and the retention rod is preferably adapted to move axially within the actuating tube. The gate nose inner and outer surfaces are generally cylindrical and have detents, the inner detents adapted to receive ball bearings, the outer detents adapted to receive projections on the mold itself. The ball bearings coordinate with the gate nose detents and with the retention rod to give the advantages of removability of the gate nose as explained above. This is an important aspect of the invention as the removable gate nose allows the mold and nose to be removed from the molding station prior to the time the product must be ejected from the mold, without loss of polymer foam, reducing the cycle time substantially.

A further advantage of the foam injection molding process is in an accumulator comprising a cylinder, a telescoping inlet section, the inlet section connected to a substantially hollow piston internal to the containing cylinder. The accumulator piston outside surface conforms to the inner contours of the containing cylinder, the piston having a head including adjustable apertures. The apertures are adjusted by use of one or more rotatable adjustment plates having openings mounted adjacent a fixed plate in the piston head with similar openings, thereby allowing variation of the quantity of polymer melt to be expelled from the accumulator as the cross-sectional area of the openings is adjusted. This essentially is a gating mechanism allowing more efficient operation of the entire apparatus since the plasticating extruder can be operated continuously, not in alternating off/on modes.

Further features and advantages of the inventive injection molding apparatus and process will be described with reference to the drawing figures as well the explanation which follows.

DESCRIPTION OF PREFERRED EMBODIMENTS

Figure 1:
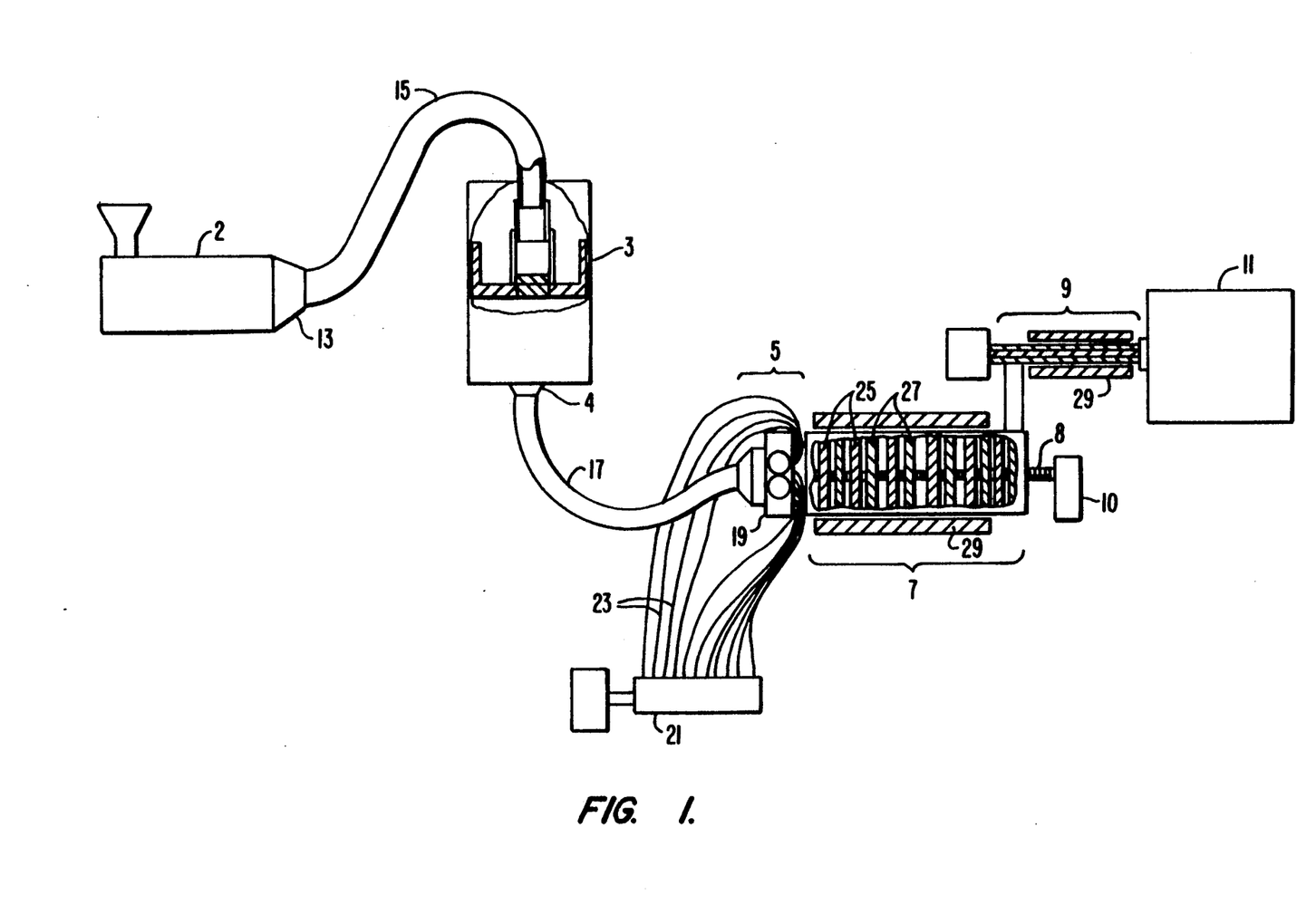
FIG. 1 is a schematic diagram of a foam injection molding process in accordance with the present invention.

FIG. 1 shows the foam injection molding process in its operational and assembled form, albeit in schematic. Similar features in similar drawings figures are given the same numbering. Thus, FIG. 1 shows at 1 the foam injection molding process, having a plasticating extruder 2, which delivers polymer melt at a preselected temperature to an accumulator 3 having an outlet 4. Further shown in schematic in FIG. 1 is foaming region 5, shearing region 7, which takes feed from the foaming region 5, and the mold gate assembly 9. Completing the process is the mold itself 11, which it will be understood can be any size and shape in accordance with the present invention. The process and apparatus of the present invention is however highly suitable for foam injection molding of products having a weight of 25 lbs. or more; the upper limit generally depending on customer demand. Those skilled in the art will recognize that there is essentially no lower limit on part weight that can be injected molded using this apparatus. The size of the finished product from mold 11 is limited only by the practical aspects of handling an extremely large plastic part and by the customer's needs.

Again referring to FIG. 1, the process can be described in more detail as having an extruder 2 in which polymer melt is extruded through a die 13, the polymer melt passing through an accumulator inlet pipe 15, the accumulator 3, and an accumulator outlet 4. Further shown in FIG. 1 is an accumulator outlet pipe 17 leading directly to the gear pump 19. (In other preferred embodiments accumulator outlet 17 may be shortened considerably or entirely deleted.) The gear pump has two gears which rotate in the direction of the arrows as shown. Gas bubble pump 21 has a plurality of gas conduits 23 leading therefrom into the outlet of gear pump 19. Polymer melt thus flows through gear pump 19, takes up gas bubbles in the foaming region 5, and then passes through shearing region 7. Shearing region 7 has extrusion plates 25 having holes 67 (see FIG. 5) and rotating blades 27.

The spacing between extrusion plates 25 and rotating blades 27 is generally substantially constant, but can vary. In one preferred embodiment, the spacing between extrusion plates 25 and rotating blades 27 is very small, on the order of about 5 mm to about 10 mm.

The size and number of holes 67 in extrusion plates 25 are not critical and may vary, not only from extrusion plate to extrusion plate, but within individual extrusion plates 25. Preferably holes 67 range from about 0.030 inch (0.8 mm) to about 0.125 inch (3.5 mm). The particular number of holes 67 depends of course on the diameter of both extrusion plates 25 and holes 67, and is within the skill of persons familiar with fluid mechanics, the only critical aspect being that enough holes are provided so as to not build too great a pressure in as polymer melt flows through the apparatus.

The entire shearing region is heated via heating bands 29, thus keeping the entire polymer melt at a preselected temperature as it passes from extruder 2 to mold assembly 11, contrary to methods well known in the art where the melt cools somewhat as it flows into the mold cavity. All component parts of the process which are in contact with the polymer melt are kept at essentially the polymer melt temperature as required under various process conditions which can be determined by the operator. In one preferred embodiment, when polymer foam is formulated using polypropylene, the temperature of the processing apparatus ranges from about 250° F. to about 525° F., more preferably ranging from about 375° F. to about 425° F.

Figure 2:
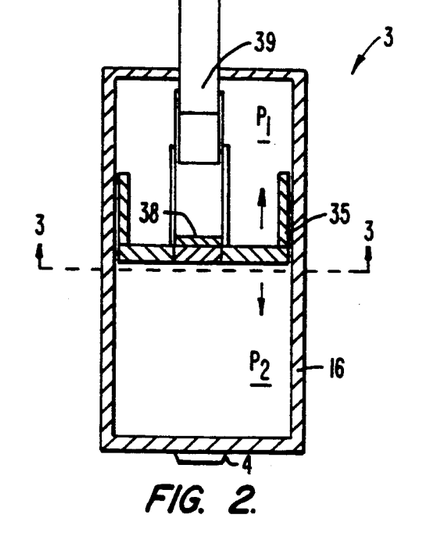
FIG. 2 is a cross-sectional elevation view of an accumulator in accordance with the present invention.
Figure 3:
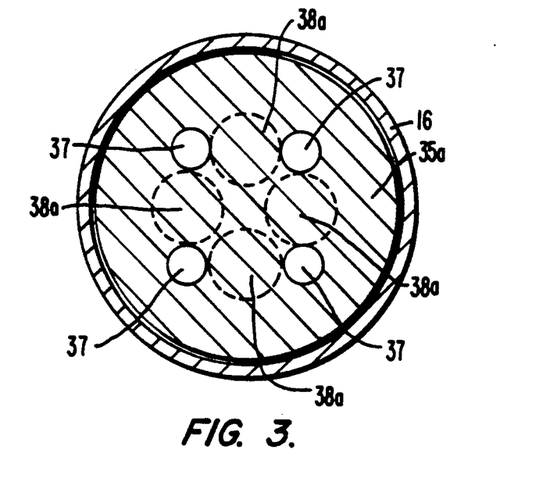
FIG. 3 shows a cross-sectional view of the accumulator shown in FIG. 2, showing the apertures in the adjustable plates located in the piston head.

Referring now to FIGS. 2 and 3, FIG. 2 shows an elevated cross section of an accumulator in accordance with the present invention. The accumulator, shown generally at 3, has cylinder 16, cup-shaped piston 35, adjustment holes 37 in piston head 35a, and an adjustment plate 38 having holes 38a which can be rotated within the cup-shaped piston 35. Piston 35 generally has an external contour which aligns with the inside surface of accumulator 3. It will be understood that the physical shape and size of the accumulator will vary depending on the processor's needs. This embodiment of the accumulator is completed by having a telescoping inlet section 39 which receives polymer melt from the plasticating extruder 2. As can be seen in FIGS. 1-3, this type of telescoping inlet 39 on accumulator 3 allows the plasticating extruder to be operated continuously and in "first-in-first-out" mode, even should a mold assembly 11 not be on the process as shown in FIG. 1 for an extended period. This allows more efficient operation of the extruder and reduced waste plastic, since operational discontinuities and departure from first-in-first-out flow pattern in injection molding apparatus are well known sources of excessive power consumption and plastic degradation.

Adjustment plate 38 can be arranged so that its holes 38a are either fully or partially aligned, or fully unaligned, with holes 37 in piston head 35a (FIG. 3 shows the respective holes fully unaligned for clarity). The alignment is chosen by the operator so that the pressure $P_1$ is always greater than pressure $P_2$ (see FIG. 2) when melt flow into mold 11 is greater than melt production from extruder 2, causing piston 35 to move downwards as shown in the arrow of FIG. 2 as gear pump 19 accepts polymer melt from accumulator 3. When one mold has thus been filled to its required amount, and flow to the mold station is stopped, $P_2$ will be higher than $P_1$ and piston 35 will move upward as shown by the alternate arrow in FIG. 2. As will be noted by those skilled in the art, a single plate with a single hole can be designed to produce repeated moldings using the same polymer, and this is considered to be within the scope of the invention.

Figure 4:
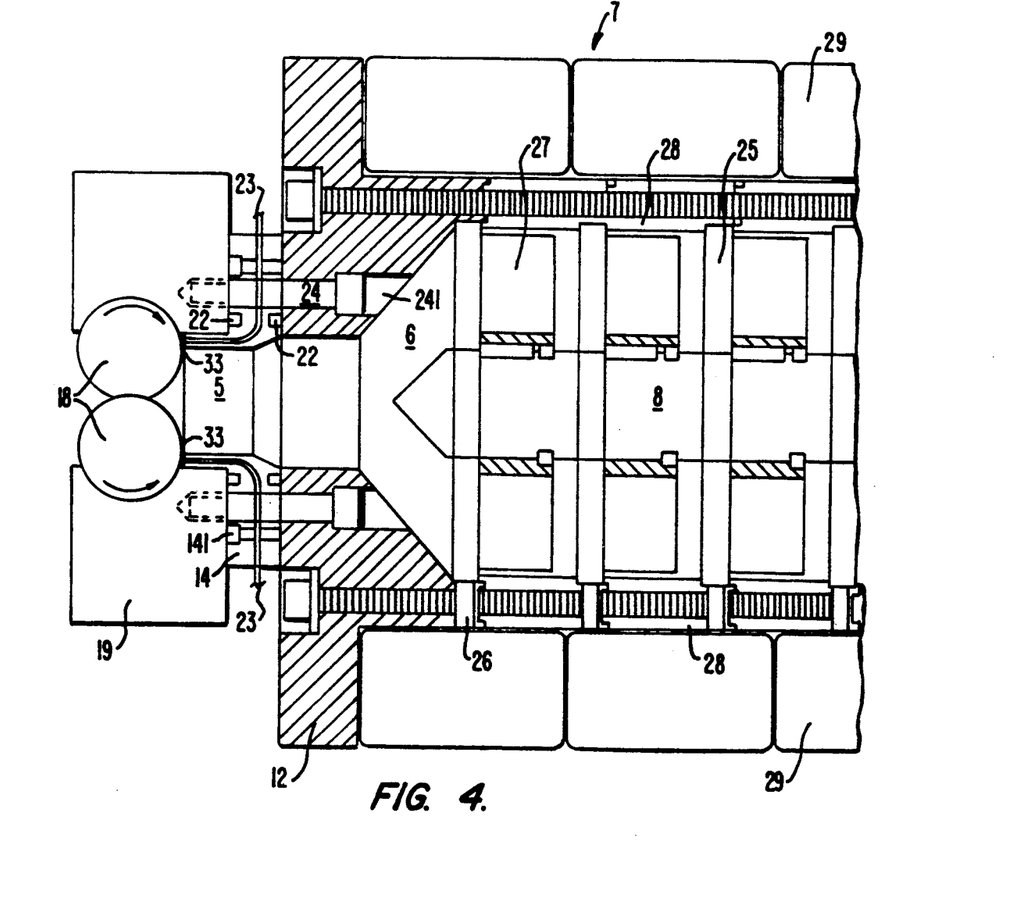
FIG. 4 shows a cross-section view of a foaming region and part of a shearing region, showing gear pump, mixing region, shearing region, extrusion plates, and rotating blades of the shearing region.

FIG. 4 shows a cross section of a mixing region and a foaming region. The embodiments shown in FIG. 4 include a foaming region generally at 5, and an expanded foaming region 6, leading into a shearing region 7. Shearing region 7 includes a shearing region shaft 8, onto which rotating blades 27 are attached. Shearing region shaft 8 passes through extrusion plates 25 and is supported thereby. In further detail, FIG. 4 shows gas conduit plate 14 with hold down bolts 141, which hold the conduit plate to the shear box 12. Gas bubble conduits 23 are shown passing through conduit plate 14, gas conduits 23 having their distal ends at the outlet of gears 18 of gear pump 19. In this way, the gas pulses or bubbles which pass through conduits 23 are injected directly into the polymer melt at the highest shear point, shown at 33 in FIG. 4. This ensures a highly divided gas in the polymer melt, and although the pressure drops somewhat in passing through the expanded region 6, the polymer melt having gas therein then passes through extruder plates 25 having holes therein and then preferably immediately through shearing plates 27. Thus the polymer foam is enduring a series of shearing actions which further reduce the gas bubbles and prevent them from coalescing into larger bubbles or pockets within the polymer melt, which is disadvantageous to the expansion of the gas within the mold.

Further shown in FIG. 4 is the extrusion plate holding bolts 26, space bar 28, and heating bands 29, the heating bands maintaining the temperature of the polymer foam as it passes through the shearing region 7. This is an extremely important feature of the invention, in that proper maintenance of temperature, shear, pressure, and gas volume and bubble size as the polymer foam approaches the mold assembly ensures a high degree of control of the blow factor of the final mold product.

According to the process of the present invention, the blow factor of the final product can be controlled by adjusting the process temperature, pressure, and size or volume of the gas bubbles in the polymer foam. This degree of control has not heretofore been seen and is quite advantageous in producing large structural parts which do not shrink or warp upon cooling. For example, the thickness of a bubble free region of the final foam injection molded product can be controlled either by increasing the injection pressure through gear pump 19, and increasing the amount of polymer melt pumped. Alternatively, the blow factor may be controlled by increasing the process temperature to increase the bubble free region. Increasing temperature expands the gas and causes bubbles to collapse near the mold wall. Another control alternative comprises decreasing the amount of gas injected to form the polymer foam. These four parameters, process temperature, process pressure, amount of gas in the polymer foam, and size of the gas bubbles, provide a great degree of control of the physical characteristics of the final product.

Preferably, the blow factor can be controlled within a range of from about 1% to about 80%. More preferably, the blow factor can be controlled within a range of about 20% to about 60%. Thus, if one knows the specific gravity of the polymer resin to be used, for example, polypropylene ranging from about 0.94 to about 0.99, and if one knows the weight of the particular foam injection molded product that the customer wishes to achieve for particular size, the blow factor can be adjusted to meet the customer weight and size precisely.

Not only can the weight and size be precisely controlled however, the structural integrity of the wall sections of the molded piece can be controlled by the blow factor control of the present invention. As the gear pump and bubble pump are positive displacement momentum transfer devices, the quantities of polymer melt and gas to be combined can be precisely controlled, and by means of the shearing region, the gas dispersion in the polymer melt can be controlled to produce a highly uniform polymer foam. This in turn leads to a great degree of control over the bubble free region or the skin region thickness in the final product. A gradual change from a no bubble region to a region of relatively large bubbles is important to prevent shrinkage and warpage of solidified large products. Generally larger parts need thicker outer skins for structure, but since larger parts shrink more, a high degree of control is desirable and achievable with the methods and apparatus described herein.

Some further, although perhaps more cumbersome methods of controlling the blow factor can be envisioned, wherein the hole size in the extrusion plates, rotation rate of the rotating blades, and individual spacing between extrusion plates and rotating blades could be adjusted on-line, that is, while injecting foam into a mold. Preferably, the spacing between extrusion plates and rotating blades is minimal and as small as possible without creating unnecessary friction. The typical spacing ranges from about 0 mm to about 20 mm, more preferably from about 0 mm to about 15 mm.

Figure 5:
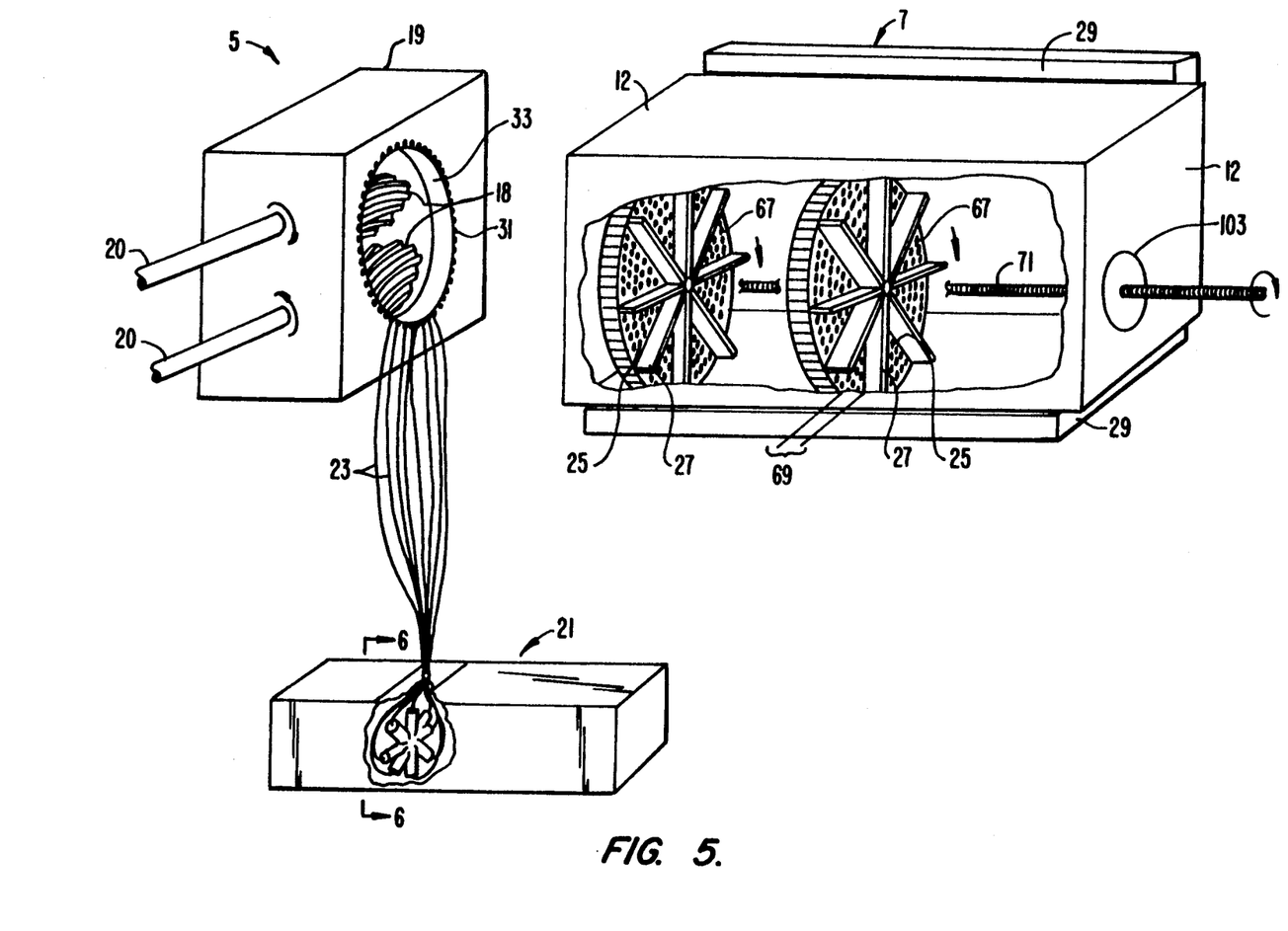
FIG. 5 shows a perspective, partially sectioned view of the polymer foaming and shearing region of a polymer foam injection apparatus.

Referring now to FIG. 5, a perspective, partially sectioned view of a mixing region 5, shearing region 7 and gas bubble pump 21 is shown. Gas conduits 23 are shown leading from individual cylinders 43 of gas pump 21, ending at individual gas bubble inlet holes 31 around the circumference of gear pump outlet 33, at the point of highest turbulence, pulsing, and folding caused by the blades of gear pump 19. (Note all conduits 23 are not shown for sake of clarity. The conduits 23 that are not shown would lead from further "banks" of cylinders 43, as shown in FIG. 1, but not shown for clarity purposes in FIGS. 4 and 5.) As shown in FIG. 5, shear plates 25 have holes 67 through which polymer foam flows. The important feature shown in FIG. 5 is the extrusion plate/rotating blade spacing 69 (shown essentially as 0 in FIG. 5). Although the spacing 69 can be any degree ranging from about 0 to about 20 mm, it is preferred that the rotating blades are essentially right up against the extrusion plates 25. In this embodiment, it can be seen that as the polymer melt having gas bubbles therein flows through extrusion plates 25 having somewhat smaller holes than the initial gas bubble size in the melt, the polymer foam will immediately pass through a high shear region precipitated by the rotating blades 27. Although most polymer melts will exhibit an increase in viscosity due to the high shear, the entire apparatus is kept heated by heating bands 29, thus keeping the viscosity at a controllable level. The advantage of having small gas bubble sizes overshadows the disadvantage of any increase in viscosity. Typically, the bubbles have volumes ranging from 0.01 cc to about 0.20 cc, more preferably ranging from about 0.01 cc to about 0.10 cc.

Gases used in the process for injection into the polymer melt may be inert to or react with the polymer melt, and may be a single gas or combination of gases. In some cases gases or gas mixtures which react in some way with the polymer melt may be disadvantageous. Oxygen, for example, degrades most polymers by oxidation, especially polymers having double bonds, ether linkages, or tertiary carbons. If the prevention of oxidation is not critical, ordinary shop air can be used as the gas. Bottled gases, commercially available meeting known specifications, such as nitrogen, may be preferred in some applications. The gases may contain small amounts of moisture; however, if the polymer has hydrolyzable linkages such as urethanes and aliphatic ester groups, care must be taken to eliminate moisture. Preferred gases have little moisture and can be considered substantially dry. In most cases, shop air is the preferred gas because of its general availability to run air tools and because it is relatively inexpensive compared with bottled gases.

Figure 6:
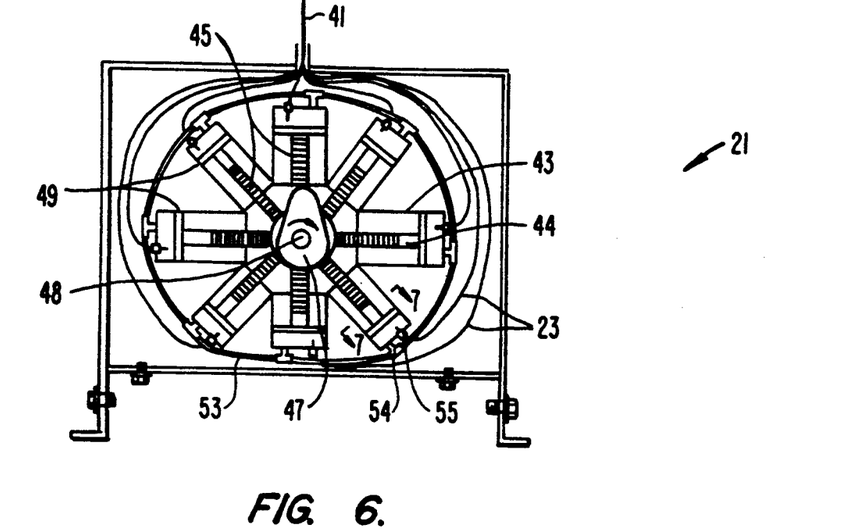
FIG. 6 is a cross-section view of a bubble pump.
Figure 7:
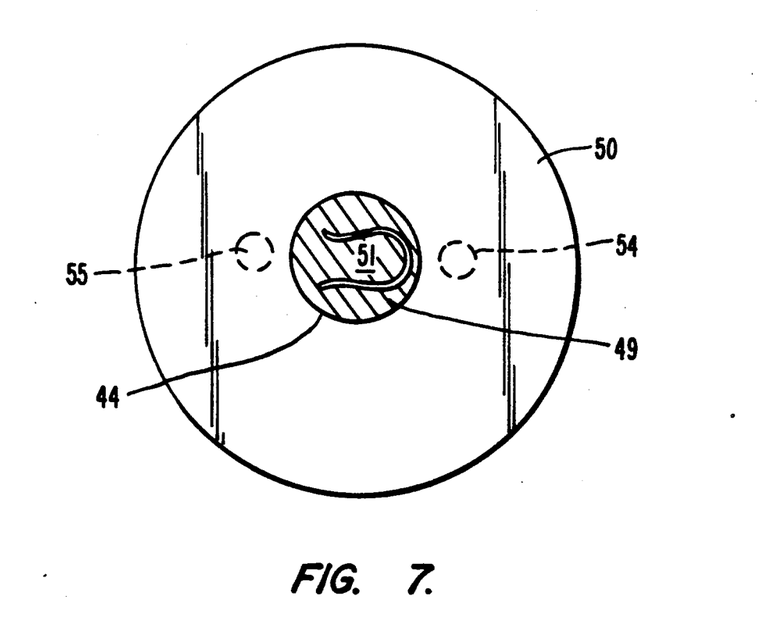
FIG. 7 shows a cross-section of one cylinder of the bubble pump shown in FIG. 6 showing the reed valve which forms individual bubbles or pulses of gas.

The gas bubble pump of the present invention is shown in one embodiment in FIG. 6 in cross section. At 41 is shown gas outlets from bubble pump 21 comprising eight gas conduits 23, as shown in FIGS. 4 and 5. Bubble pump 21 has cylinders 43, the cylinders having cylinder bore 44 and pistons 45. Pistons 45 reciprocate in cylinder bores 44 when cam 47 is rotated on cam shaft 48. Each cylinder 43 has a cylinder discharge plate 49, shown more clearly in FIG. 7. As each individual piston 45 moves towards individual discharge plate 49, gas is compressed and then is passed through cylinder outlets 55 and through conduits 23 and on toward the mixing region. With reference to FIG. 7, is can be seen that cylinder discharge plate 49 has an elastic flap 51 forming a reed valve in each cylinder. As cam 47 rotates, each piston forces gas to compress within each cylinder 43 until flap 51 is caused to move from its initial sealed position to an extended position thereby releasing gas. The gas released is not continuous but is rather in a pulse or bubble form. The degree of control of elasticity of flap 51 allows very precise control of pulse volume going into the polymer foam. Further, the radial design allows gas to be put into the polymer melt as pulses at different times and locations at gear pump outlet 33. Such a high degree of control is not known or disclosed in other foaming apparatus to the knowledge of the inventor.

The discharge pressure of the bubble pump can range from about 300 psi to about 1000 psi, with a range of about 300 psi to about 500 psi being preferable. Further, the bubbles preferably have a volume ranging from about 0.01 cc to about 0.20 cc, more preferably ranging from about 0.01 cc to about 0.10 cc. Therefore, any materials of construction which can meet these requirements have utility for the present bubble pump construction. For example, material of choice for the cylinders is regular carbon steel, while the reed valves can be metal alloy, copper, or plastic such as polypropylene or high strength fluoropolymers, such as polytetrafluoroethylene.

Figure 8:
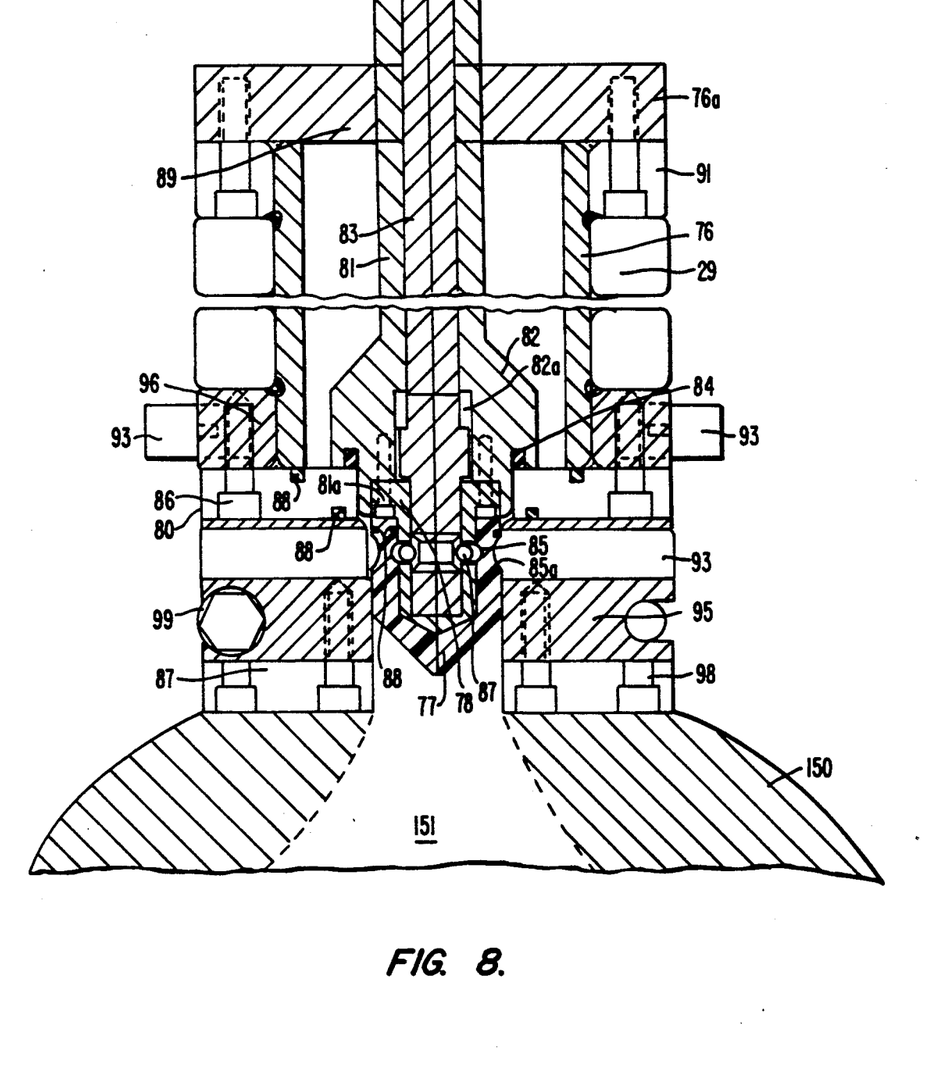
FIG. 8 shows a detail cross-section of the gate assembly in accordance with the present invention.

Referring now to FIG. 8, a gate assembly is shown having gate extension tube 76 which axially contains therein the mechanism which operates retention and ejection of gate nose 77. Gate nose 77 is removably attached to gate nose arbor 78, the gate nose arbor being permanently attached to a gate valve actuating tube 81 via bolts 81a. Gate valve actuating tube 81 correspondingly has a gate head 82, with an expanded hollow section whose function is to be described herein. Gate head expanded section 82a has coaxially and movably contained therein gate valve nose retention rod 83. Gasket 84 is provided to seal gate valve actuating tube 81 against gate plate 80 as described below. As shown in FIG. 8, gate nose 77 has internal grooves 85 on its inner surface, these grooves allowing movement of ball bearings 87 into and out thereof. Ball bearings 87 are also movable within gate nose arbor 78 in a fashion to be further described with reference to FIGS. 9 through 12. Various other gaskets have similar functions and are shown collectively as 88. Mold retaining pins 93 hold a mold 150 having polymer foam passage 151 onto gate plate 80, gate plate 80 being held to gate extension tube flange 76a via bolts 86. Other parts of the molding station shown in FIG. 8 include a mold gate 95 and mold gate adaptor plate and bolting assembly 97. Pivot bolt assembly 99 allows the mold gate adaptor plate and bolting assembly to be pivoted away from the mold after the mold is removed from the injection molding machine. Heating bands 29 are shown in this embodiment surrounding the entire circumference of gate extension tube 76.

Figure 9:
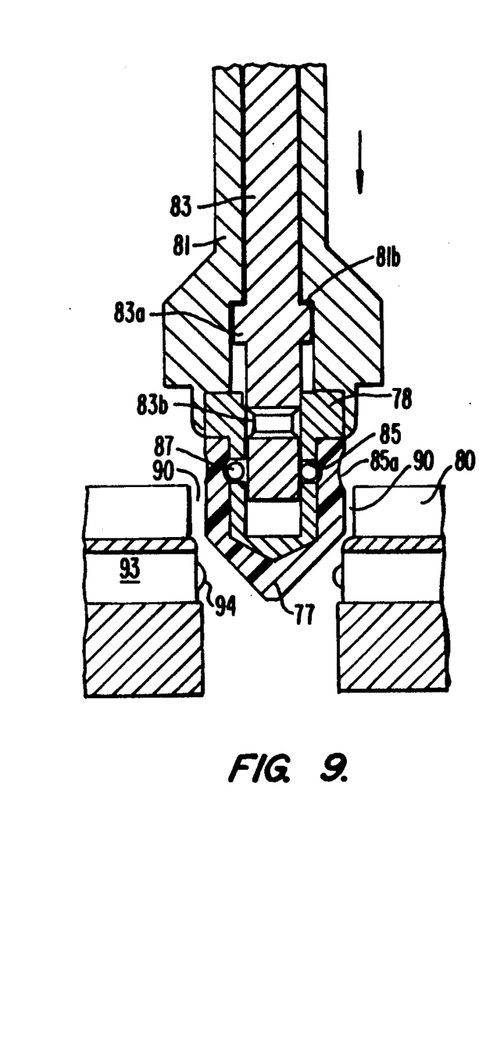
FIGS. 9-12 further show the gate assembly of FIG. 8 in various positions of operation, in which the nose piece is shown removable.

Now referring to FIGS. 9 through 12, the operation of the mold gate assembly is described. The operation can be described in four repeatable steps for each mold to be used in the process. Gate nose 77 is designed to fit in all of the mold gate adaptor plates 97 used in the process so that different sizes of gate nose 77 need not be fashioned for different size molds. (For clarity purposes, only detail reference numerals are given in FIG. 9, it being understood that the same numerals are used for the same parts in FIGS. 10–12.) In FIG. 9, note that gate valve nose retention rod 83 is moved axially in the vertical direction coaxial within gate valve actuating tube 81, that is, radial extensions 83a in gate nose retention rod 83 are abutted against notch 81b of gate valve actuating tube 81. In this first position, note that ball bearings 87 have moved to a position where at least part of the ball bearings lie within the inner surface of the internal groove 85 of gate nose 77. (Note that gate nose arbor 78 has through holes through which ball bearings 87 move, the through holes are not numbered for clarity.)

Figure 10:
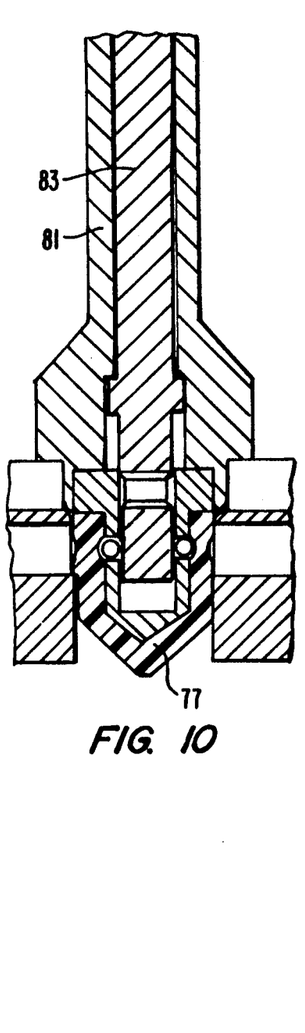

As the gate valve actuating tube 81 and gate valve nose retention rod 83 are simultaneously moved axially stopping the polymer foam flow in the direction of the arrow shown in FIG. 9, gate nose external grooves 85a on the outer surface of gate nose 77 engages mold retaining pin projections 94 on mold retaining pins 93, as shown in FIG. 10. FIG. 9 represents the position of the mold gate assembly when polymer foam is flowing into a mold, whereas FIG. 10 represents the position of the gate assembly when polymer foam has partially filled a mold and it is desired to terminate polymer foam flow to the mold, using sealing gaskets 84 and 88. This stage usually occurs when the mold cavity has attained about 60% to about 95% of complete mold fill, more preferably about 75% to about 90% mold fill volume. Gas pressure within the gas bubbles causes the foam to expand and fill the remainder of the mold cavity ("free rise"). The free rise can be adjusted precisely by the operator so that a variety of skin thicknesses and blow factors can be obtained using the same apparatus. As shown in FIG. 10, gate valve nose retention rod 83 has not changed position axially within gate valve actuating tube 81.

Figure 11:
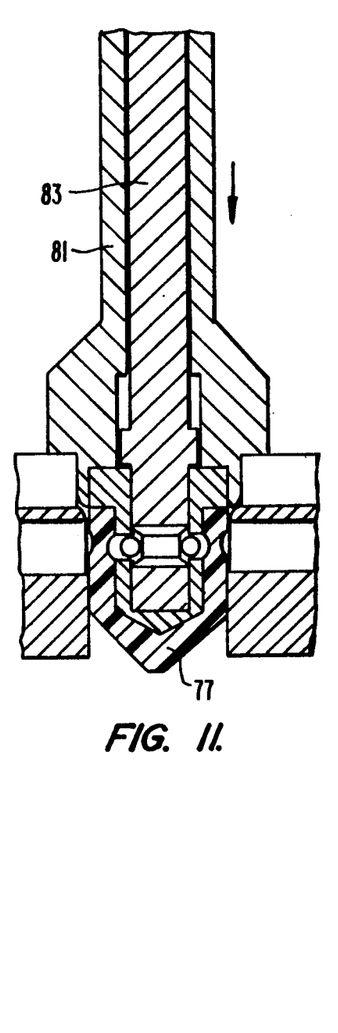
Figure 12:
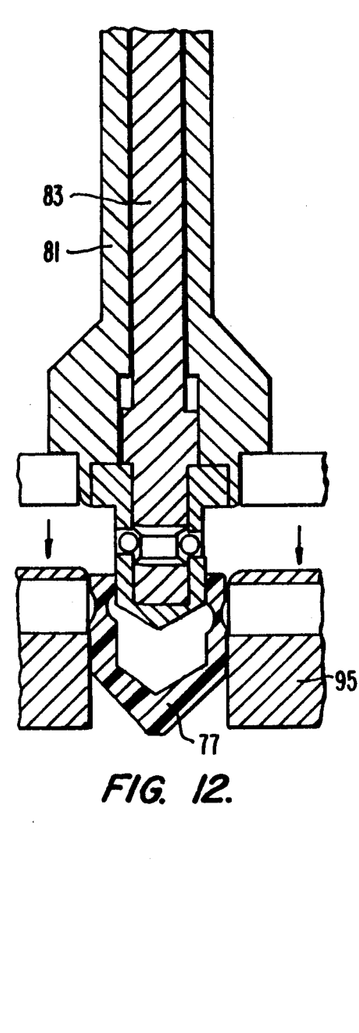

Referring now to FIGS. 11 and 12, gate valve nose retention rod 83 is now moved in the direction of the arrow shown in FIG. 11. This movement causes gate valve nose retention rod radial depressions 83b (FIG. 9) to move into a position to partially accept ball bearings 87. As discussed previously, ball bearings 87 move through holes 85 in gate nose arbor 78. In the positions of FIGS. 11 and 12, ball bearings 87 now have none of their diameter within gate nose internal groove 85, and simultaneously gate nose external grooves 85a, which are on the outside surface of gate nose 77, are engaged by mold retaining pin projections 94 (FIG. 9).

Progressing from FIG. 11 to FIG. 12, the mold gate assembly 95 and mold 150 (not shown) are now ready to be removed from the machine with the mold having polymer foam therein filled to a preselected percentage of capacity. Mold gate assembly 95 is moved in the direction of arrows shown in FIG. 12. Gate nose retention rod radial extensions 83a are moved to a position away from gate valve actuating tube notch 81b (FIG. 9). Thus, as mold gate assembly 95 and mold 150 are pulled away from the injection molding machine proper, gate nose 77 remains with the mold gate 95. As a final step in the sequence, a new gate nose 77 (not shown) may be inserted onto gate nose arbor 78, a new and different mold assembly attached to the machine, and gate valve actuating tube 81 and gate valve nose retention rod 83 moved in the direction opposite to the arrow shown in FIG. 9 so that polymer foam may flow into a new mold, and so on.

The exact configuration of the connection between the mixing/shearing region and the gate extension tube 76 is not critical, although gate extension tube 76 typically projects at a substantially 90° angle to the shearing region shaft 8. Gate extension tube 76 and gate valve actuating tube 81, etc. generally will lie in a plane parallel to that of the mixing/shearing region, this being merely for accessible arrangement of the drive means of gate valve actuating tube 81, gate valve nose retention rod 83, and shearing region shaft 8. The drive mechanisms for the mold gate assembly and the shearing region are well known in the art and are generally purchased items. For example, the shearing region shaft can be driven by a typical motor, gear box, and drive belt assembly. This arrangement will allow for controlling the rate of rotation of the shearing region drive shaft 8, and thus the rotating blades 27. Further, gate valve actuating tube 81 and gate valve nose retention rod 83 may be actuated by coaxially moving hydraulic pistons, the hydraulic mechanisms generally being purchased items. The materials of construction of pieces such as the gate extension tube, gate valve actuating tube, gate nose retention rod, etc. are well known in the art and are typically carbon steel or one of the many varieties of stainless steel, such as a 316 stainless.

Figure 13:
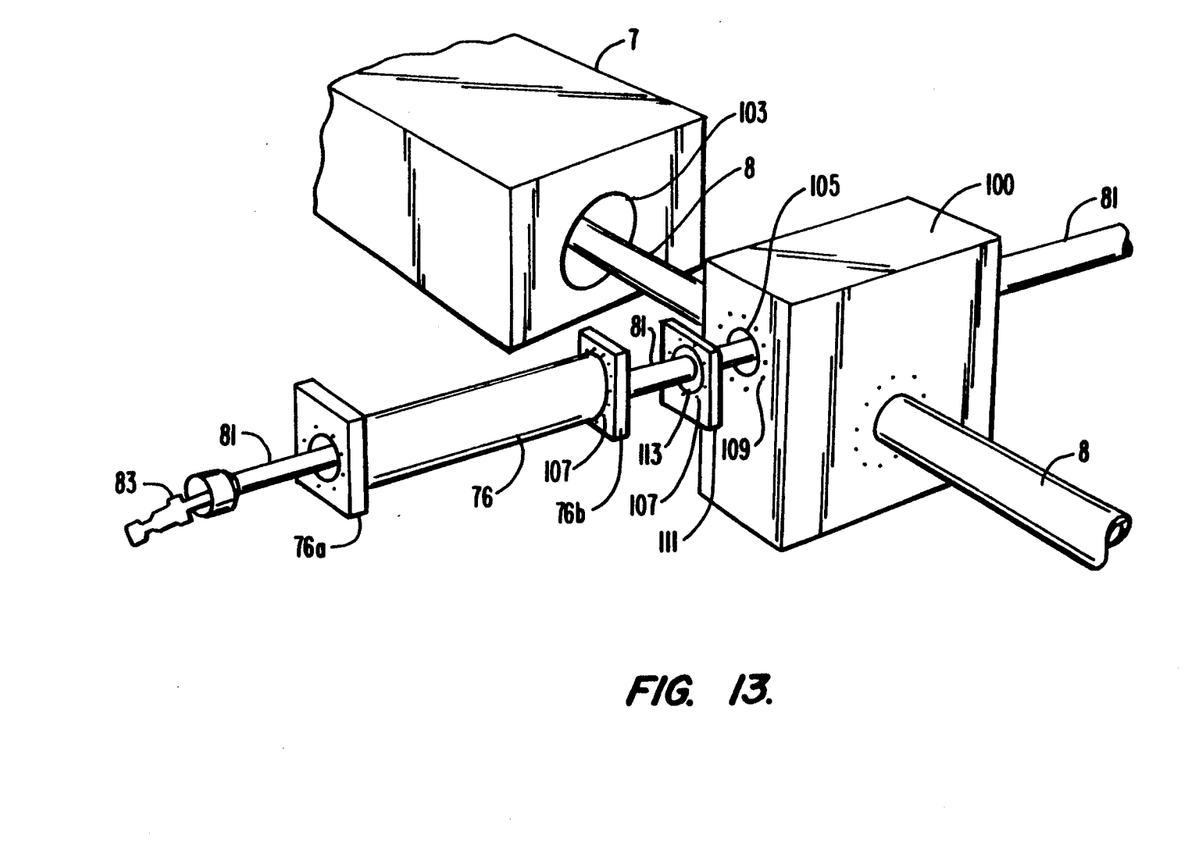
FIG. 13 is a partially exploded perspective view of a transition block, showing how the shearing region, transition block, and gate extension tube and corresponding gate assembly may be configured in one embodiment.

A typical connector region between the shearing region and the mold gate assembly is shown in FIG. 13 generally at transition block 100. In FIG. 13, polymer foam passes through shearing region outlet 103 and subsequently through transition block 100, which is substantially hollow. Polymer foam then moves through transition block outlet 105 and on into gate extension tube 76. Gate extension tube 76, having flanges 76a and b, can then be connected to transition block 100 and mold gate assembly 95. Gate valve actuating tube 81 has a diameter which is smaller than gate extension tube 76, allowing polymer foam to flow around gate valve actuating tube 81. As can be seen in FIG. 13, the arrangement of transition block 100 allows positioning of drive means for shearing region shaft 8 and gate valve actuating tube 81 and gate valve nose retention rod 83 to be positioned accordingly, for ease of operation and maintenance. (The drivers for the assemblies are not shown in FIG. 13, being well known in the art.) In the embodiment shown in FIG. 13, transition block 100 is made of aluminum, although other materials, such as carbon cast iron, steel or stainless steel may be appropriate. Aluminum has the advantages of being easily machinable and is suitable for most purposes because of its quickness in changing temperatures due to its inherently excellent thermal properties.

Transition block flange 111 and outlet 113 have a diameter similar or equal to the internal diameter of gate extension tube 76, allowing polymer foam to flow through transition block 100 and through gate extension tube 76, allowing gate valve actuating tube to move coaxially therethrough. Transition block flange 111 has bolt holes 112 which mate with holes 107 and holes 109 in the gate extension tube flange and transition block, respectively. It will be noted by those skilled in the art that the placement of the bolts can be equally spaced or nonequally spaced according to the pressures the manufacturer wishes to use in the process and to prevent leakage of polymer foam. It will also be noted that the relative angle between the gate assembly, that is, the gate valve actuating tube 81, etc., and the shearing region shaft 8 can vary to angles other than substantially 90°.

The materials of construction of the various component parts of the injection molding apparatus described herein are similar to those generally used in injection molding machines. Similarly, materials used in the bubble pump may be any of those materials used with compression equipment as known in the art. The accumulator 3, piston 35, telescoping inlet 39, and the various other parts of accumulator 3 may be made of any material which can withstand the processing temperatures and pressures used for the polymer foam injection process. Generally the materials of preference are carbon steel due to its low cost, although more exotic alloys may be required, such as stainless and high chrome steels. Again, the choice of materials depends on the particular process, although when processing polypropylene into a polymer foam, the choice of material is generally carbon steel. Many items are commercially available: gear pump, gaskets, ball bearings, motors, gear boxes, gear box and motor couplings, heater bands, drive belts and pulleys, and reed valves being examples.

The foregoing description is offered primarily for purposes of illustration. It will be readily apparent to those skilled in the art that further modifications, variations and the like may be introduced in the materials, configurations, arrangements and shapes of the various elements of the structure and process without departing from the spirit and scope of the invention. For example, an automated, "closed-loop" control system could be used rather than an "open-loop," human controlled system for controlling blow factor and reducing cycle time of the process described herein. Suitable closed-loop systems might include a supervisory control computer, which takes input information such as polymer foam and mold temperatures, gas bubble content, and polymer foam viscosity, and adjusts the rotation speed of the rotating blades in the shearing region, or the output from the gas bubble pump. Other variations of control schemes can be envisioned and are deemed within the scope of the appended claims.

What is claimed is:

1. A foam thermoplastic injection molding process allowing exact control of solidified product blow factor comprising:
    plasticating a solid polymer into a polymer melt;

feeding said polymer melt to an inlet end of an accumulator through a telescoping inlet conduit which terminates in a piston head, said piston head having one or more holes of adjustable size to permit said polymer melt to pass therethrough;

drawing said polymer melt from said accumulator at an outlet end thereof, said inlet and outlet ends being at opposing sides of said piston head;

passing said polymer melt thus drawn from said accumulator into a mixing region;

combining said polymer melt in said mixing region with gas to form a polymer foam;

shearing said polymer foam while controlling the temperature thereof to a preselected temperature, thereby homogenizing said polymer foam to a preselected bubble size;

injecting said homogenized polymer foam into a mold; and solidifying said homogenized polymer foam.

2. A process in accordance with claim 1 wherein said plasticating is performed continuously through a plurality of molding shots.

3. A process in accordance with claim 1 wherein said shearing comprises forcing said polymer melt through a plurality of alternating extrusion plates and rotating blades.

4. A process in accordance with claim 1 further comprising controlling the injection pressure and the amount of polymer melt drawn from said accumulator to form a bubble free region of preselected thickness in said homogenized polymer foam thus solidified.

5. A process in accordance with claim 1 further comprising controlling the mold temperature to form a bubble free region of preselected thickness in said homogenized polymer foam thus solidified.

6. A process in accordance with claim 1 further comprising controlling the amount of said gas combined with said polymer foam.

7. A process in accordance with claim 1 further comprising simultaneously increasing the pressure and lowering the amount of gas combined with said polymer melt to form a bubble free region of preselected size.

8. A process in accordance with claim 1 further comprising simultaneously increasing the mold temperature and mold pressure to form a bubble free region of preselected size.

9. A process in accordance with claim 1 further comprising adjusting the mold temperature and pressure and the size and volume of gas bubbles to achieve a blow factor ranging from about 1% to about 80%.

10. A process in accordance with claim 1 further comprising adjusting the mold temperature and pressure and the size and volume of gas bubbles to achieve a blow factor ranging from about 20% to about 60%.

11. A method of controlling the blow factor in a large polymer foam injection molded product comprising:
  (a) plasticating a solid polymer to form a polymer melt at a preselected temperature;
  flowing a preselected amount of said polymer melt into a foaming region;
  (b) combining said polymer melt with gas in a preselected proportion and at said preselected controlled temperature to form a polymer foam with a preselected blow factor;
  (c) flowing said polymer foam through a shearing region having a plurality of perforated extrusion plates, each said perforated extrusion plate swept by a rotating blade spaced therefrom by a preselected distance while controlling the temperature of said polymer foam at said preselected temperature by heating elements external to said shearing region, to shear said polymer foam, thereby homogenizing said polymer foam to a preselected reduced bubble size;
  (d) injecting said polymer foam thus sheared into a mold;
  (e) expanding said polymer foam in said mold to form a substantially gas free skin region and a region having a gas bubble volume which gradually increases toward the center of said molded product; and
  (f) cooling said polymer foam thus expanded to form said foam injection molded product.

12. A method in accordance with claim 11, said preselected blow factor ranging from about 1% to about 80%.

13. A method in accordance with claim 11, said preselected blow factor ranging from about 20% to about 60%.

14. A method in accordance with claim 11, said extrusion plates having holes decreasing in size from a first extruder plate to a last extruder plate.

15. A method in accordance with claim 11 wherein step (c) is performed by means of a gear pump accepting melt from an accumulator.

16. A method in accordance with claim 11 wherein step (b) comprises flowing as bubbles into said polymer melt.

17. A method in accordance with claim 11, said extrusion plates all having holes of substantially the same diameter.

18. A method in accordance with claim 11 wherein step (d) comprises flowing said polymer foam through a gate assembly, said gate assembly having a nose piece that removably attaches to said mold.

19. A method in accordance with claim 18 wherein said nose piece of said gate assembly is a substantially hollow article, said article having detents on its inner and outer surfaces.

* * * * *